(No Model.)
C. D. HILL.
HORSE DETACHING DEVICE.
No. 470,127. Patented Mar. 1, 1892.
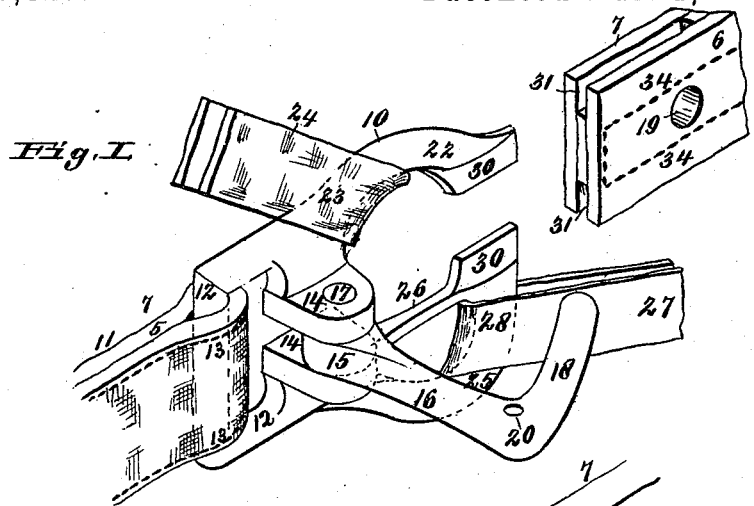
Fig. I.
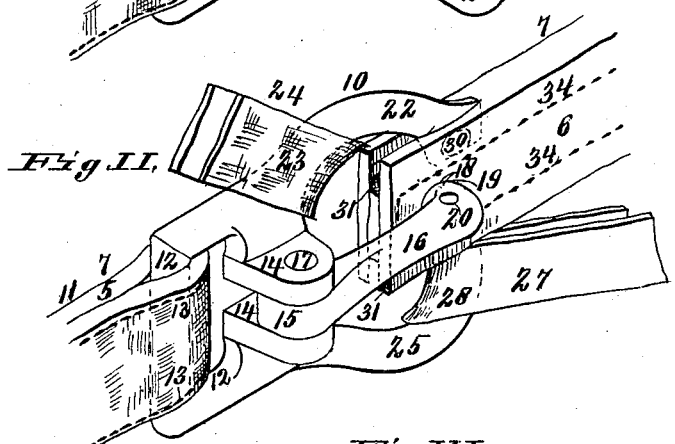
Fig. II.
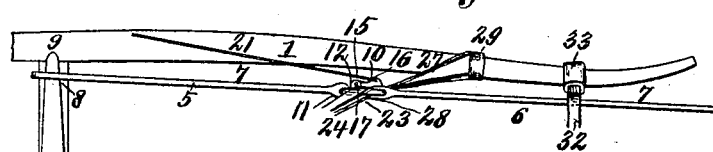
Fig. III.
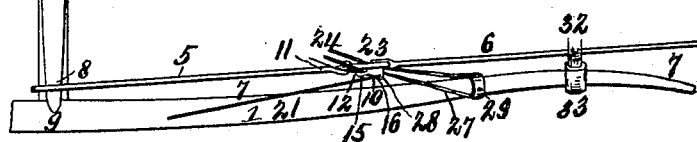
Attest:
A. W. Davis
A. M. Obersole
Inventor:
Charles D. Hill
By Knight Bros,
Attys

UNITED STATES PATENT OFFICE.

CHARLES D. HILL, OF ST. LOUIS, MISSOURI, ASSIGNOR OF ONE-HALF TO ELIHU BLACK, OF MONMOUTH, ILLINOIS.

HORSE-DETACHING DEVICE.

SPECIFICATION forming part of Letters Patent No. 470,127, dated March 1, 1892.

Application filed October 13, 1891. Serial No. 408,562. (No model.)

*To all whom it may concern:*

Be it known that I, CHARLES D. HILL, of the city of St. Louis, in the State of Missouri, have invented a certain new and useful Improvement in a Harness-Hitch and Horse-Detacher, of which the following is a full, clear, and exact description, reference being had to the accompanying drawings, forming part of this specification.

This invention is an improvement on my horse-detacher for which a patent was issued August 27, 1889, No. 410,097; and it consists in detachable sectional tugs, the forward sections of which tugs alone are carried by the horse when unhitched from the vehicle, and the two moieties of which tugs are united by a pivoted coupling trip-hook mounted on a double loop-strap carrier attachment-plate; and the invention consists in features of novelty hereinafter fully described, and pointed out in the claims.

Figure I is a perspective view of the tug-coupling devices in their detached position, and shows the grooves in the rear end of the forward moiety of the tug and the tongues in the coupling-plate that when attached are seated in said grooves. Fig. II is a perspective view of the same devices in their coupled position, and shows the tongues on the coupling-plate seated in the grooves in the tug and the coupling-hook engaged in its perforate seat in said tug; and Fig. III is a top detail view of a pair of shafts, to which my quick harness-hitch and rapid trip-detaching devices are secured.

Referring to the drawings, 1 represents the shafts or thills, 2 the coupling draft-bar that secures said thills together, and to which the singletree 3 is secured by the draft-bolt 4, which bolt passes through said singletree and said draft-bar.

5 represents the rear sections, and 6 the forward sections of the divisible tugs 7. The said rear sections are provided with loop-holes 8, by means of which they are mounted on the hitch-points 9 of the singletree.

10 represents coupling-plates, which by means of their constituent parts described below couple together at each side of the harness the forward and rear sections of the tugs.

The forward lap 11 of the rear tug section on either side is passed through the rear loop 12 of said coupling-plate and brought back and secured by stitches 13 or other suitable means to the corresponding laps of the tugs.

14 represents perforate journal-bearing lugs that form parallel projections from the coupling-plate, and mounted between said lugs is the perforate stem 15 of the coupling-hook 16, which hook is journaled in its seat between said two perforate lugs by the pivot-pin 17, which pin is seated in the perforations of said lugs and of the journal-stem of said coupling-hook. The latch-turn 18 of said coupling-hook is presented at a slightly-convergent angle past its center bearing radius, so as to maintain a culminating instead of a retrograde clutch-hold in the perforation 19, near the rear end of the forward section of the tug, and thus secures its clutch-hold. A perforation 20 in the angle-turn of said coupling-hook provides the means for attaching the trip-cord chain or strap 21, by which the coupling-hook is detached.

22 represents the upper curved loop-arm of the coupling-plate, around which metal loop the bearer-loop 23 of the pendent strap 24, that hangs from the breeching, engages to support said tug at the coupling-joint of its sections.

25 represents the lower curved loop of the coupling-plate, and 26 is a stretcher-arm, that extends from the lower lug 14 to the forward end of said curved loop 25 and reinforces the same, and in contradistinction to the upper loop 22, which is an open loop, to allow the free escape of the bearer-loop 23 of the pendent strap 24 when the horse is unhitched. The said lower loop 25 is a closed loop for reasons specified hereinafter.

27 represents the thill or shaft holdback-strap, and 28 is its loop end, which embraces around the lower loop 25 of the coupling-plate. 29 is the binder-wind of said holdback-strap 27 around the shaft which constitutes the lower member of the holdback, that is controlled by the connection between said shafts and the breeching by means of said straps 24 and 27 and their intermediate coupling-plate 10.

30 represents tongues that respectively project toward each other from the upper arm 22 and the lower arm 25 of the coupling-plate.

31 represents grooves in the upper and lower edges at the rear ends of the forward sections of the tugs. These grooves may be constructed as shown in Figs. I and II, where a three-ply tug is made by reducing the diameter of the middle ply at its rear end, so as between the edges of the outer plies of said tugs to constitute said grooves 31, in which said tongues 30 of the coupling-plate are seated when the coupling of the two sections of the tongue are effected, at which time the latch-turn 18 of the coupling-hook 16 is turned into engagement in its perforate tug-seat 19 in the forward section of the tug. Thus the said coupling-hook, in conjunction with the tongues 30 of the coupling-plate, is secured to the rear section of the tug, and when said tongues are seated in the grooves 31 of the forward tug-section, and said coupling-hook is secured in its perforate seat 19 in the forward section of said tug, a strong junction of the separable sections of said tug is thereby effected.

32 represents the usual pendent thill-bearer straps that hang from the back-band of the harness and whose bearer-loops 33 are made to embrace loosely the points of the thills and support the same when the horse is hitched, and when said horse is unhitched and passes out from the thills said bearer-loops are intended to slip off said thills and disengage the same.

When the tug-section is formed of two-ply only, the grooves 31 that seat the tongues 30 may be made by cutting away a sufficient thickness and depth of the inner portion of said two-strap plies at the rear end of said forward tug-sections to seat said coupling-tongues. In either case the two, three, or more ply, as the case may be, are secured together by the stitches 34 or by other suitable means at a sufficient distance from the edge to be clear of the grooves 31 as far as said grooves extend.

The operation of the device is as follows: The rear sections of the tugs, with the coupling plate and hook they carry, and the hold-back thill-strap remain secured to the thills when the horse is detached, so that there are no dragging portions of the harness that go with the horse when he is unhitched from the vehicle. The above-named parts being permanently hitched, the horse, to which is secured the other portions of the harness, is placed within the shafts or thills, and the loops 33 of the thill-bearer straps 32 are slipped over the points of said thills. The loops 23 of the pendent straps 24 that hang from the breeching are then slipped on the upper loop arms 22 of the coupling-plate 10, and the tongues 30 of said coupling-plate are then seated in the grooves 31 in the rear ends of the forward sections of the tug, and the coupling-hooks 16 are hooked into the perforations 19 in said tug, and as the angle locking-turns 18 of said hooks are bent past the radius curve of the arc they describe in turning into their seats they thus lock their hooked attachments, and at the same time, as the forward sections of the tugs are thus hook-locked to the tongues 30 of the coupling-plate, it follows that as long as thus secured they confine the bearer-loops 23 of the pendent straps 24 to their loop-holds of said coupling-plates. Trip strings, chains, or straps 21 are secured at one end to the perforations 20 of said coupling-hooks and their other ends may be secured by spring-snaps or otherwise to the dash-board or other convenient part of the vehicle, or said trip cord, chain, or strap may be of one stretch that connects to both coupling-hooks and whose common loop slips over the dash-board, from which it need never be removed, as the coupling-hooks to which it is attached and which it controls always remain attached to the vehicle. When it is desired to unhitch the horse, all that is required is to pull said trip cord or cords, as the case may be, when the coupling-hooks are thereby withdrawn from the forward tug-sections, which then slip out from the tongues 30 of the coupling-plate 10, and when the horse is driven off the loops 23 of the pendent breech-straps 24 slip off the loop-arms 22 over the tongues 30, as said tongues have left their locking-seats in the grooves 31 in the sections 6 of the tugs, the loops 33 of the pendent back-band strap at the same time slipping off the points of the thills. It will thus be seen that the horse can be unhitched and driven off to the stable without touching the horse or harness other than said trip-cord and the lines by which the horse is driven, and no part of the harness that the horse carries after unhitching drags on the ground. The trip-cord itself remains on the vehicle, with the usual drag ends of the tugs, which in this device are separate sections and always remain hitched to the singletree. The hitching is more rapidly effected than by the usual process, as the tugs are already hitched to the singletree and the holdback-straps to the thills; but the greatest saving is in the act of unhitching, which is a single instantaneous action by the simple draw of the trip-cord, which releases the coupling-hooks and disconnects the separable sections of the tugs.

Again, one of the most important although less frequent uses to which my invention is applied is as a horse-detacher when the animal is running away with the vehicle to which he is hitched. It will be seen that at any moment when it becomes evident that the horse cannot be held back by the lines or when said lines are broken all that is required is to simply draw the trip-cord, which may be looped over the dash-board, handy to the driver, and the horse is instantaneously detached from the vehicle, which, with its occupants, is safely left behind, and except said lines any parts of the harness that would trail are by that single act detached from the horse and remain, as they always are, attached to the vehicle.

Some of the improvements on my horse-detacher for which a patent issued August 27, 1889, No. 410,097, are here briefly stated in a comparison of the devices, as follows:

First. It is found that the coupling-plates of my present device can be and are made at a cost of three cents, including finish, whereas the cost of the more complex coupling-plates of my former device is twenty-five cents apiece.

Second. My improved device (unlike the former one) has no spring in its combination, and thereby avoids what is generally found to be the weakest element in the combination.

Third. Unlike the former detacher, which was alone adapted for use with round straps, the present device is adapted for use with flat straps, thereby not only saving the largely-increased expense of round leather straps over flat leather, but also the round leather strap in such uses where it is close-nipped and subject to severe strains is liable by adverse leverage of the nip to burst and break, where the flat strap of my improved device wears well.

Fourth. The coupling-hooks of my improved tug-coupler, in conjunction with the lateral hold of the tongues 30, seated in the grooves 31 in the forward sections of the tugs, makes a preferable coupling junction of the separable sections of said tug, and the means for tripping said coupling by the direct withdrawal of the coupling-hook by the trip-cord is also an improvement.

I claim as my invention—

1. In a harness-hitch and horse-detacher, the combination of the forward sections of the separable tugs provided with the grooves 31 and the perforation 19, the rear sections of said tugs, the coupling-plates 10, consisting of the rear loops 12, mounted in said rear sections of the tugs, the perforate bearing-lugs 14, the coupling-hooks 16, mounted between said lugs, the pivot-pins 17, on which said hooks are mounted, the said hooks being provided with the trip-bearer hole 20, the upper loop-arm 22, the lower loop-arm 25, the stretcher-arm 26, and the tongues 30, substantially as and for the purpose set forth.

2. In a harness-hitch and horse-detacher, the combination of the forward sections of the separable tugs, said sections provided with the grooves 31 and the perforations 19, the rear sections of said tugs, the coupling-plates mounted on said rear sections, the said coupling-plate provided with the arms 22, 25, and 26, the perforate lugs 14, and the tongues 30, the coupling-hook 16, the pendent bearer-straps 24, suspended from the breeching and whose loops 23 embrace and sustain the arms 22 of the coupling-plate and the holdback-straps 27, whose loops 28 embrace the arms 25 of the coupling-plate and whose binder-wind 29 embraces the thills, substantially as and for the purpose set forth.

3. In a harness-hitch and horse-detacher, the combination of the forward sections of the separable tugs, said sections provided with the grooves 31 and the perforations 19, the rear sections of said tugs, the coupling-plates mounted on said rear sections, the tongues 30 of said coupling-plates, which tongues when coupled are seated in said grooves 31, the coupling-hooks 16, pivotally mounted on said coupling-plates, the said coupling-hooks provided with the latch-turns 18, which latch-turns when coupled are lock-seated in said perforations 19, the said coupling-hook provided with the perforations 20, and the trip cord or pull 21, that engages in said perforations 20, arranged to trip back the coupling-hook and unhitch the horse, substantially as and for the purpose set forth.

4. In a harness-hitch and horse-detacher, the combination of the separable sectional tugs, the forward sections of said tugs provided with the grooves 31 and perforations 19, the coupling-plates 10, mounted on the rear sections of said tugs, said coupling-plates having the arms 22, 25, and 26, the tongues 20 on said arms, that when coupled are seated in said grooves 31, the coupling-hooks pivotally mounted on said coupling-plate, said hooks having the latching-points 18, that engage, when coupled in the perforations 19, the pendent breeching-bearer straps 24, that sustain said coupling-plates, the holdback-straps 27, that permanently connect said coupling-plates to the shafts, the pendent thill-bearer strap 32, and the trip cord or pull 21, that is attached to the coupling-hooks and trip, opens the same to unhitch the horse, substantially as and for the purpose set forth.

CHARLES D. HILL.

In presence of—
B. P. VARBLE,
HENRY M. HAMMUR.